US010762093B1

(12) United States Patent
Gau et al.

(10) Patent No.: US 10,762,093 B1
(45) Date of Patent: *Sep. 1, 2020

(54) INCREASING SOCIAL NETWORK EFFECT IN QUEUE MANAGEMENT APPLICATIONS

(71) Applicant: AMERICAN INNOVATIVE APPLICATIONS CORPORATION, Clarksville, VA (US)

(72) Inventors: Shane Gau, Clarksville, VA (US); James Moody, Clarksville, VA (US)

(73) Assignee: American Innovative Applications Corporation, Clarksville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,132

(22) Filed: Sep. 9, 2019

Related U.S. Application Data

(63) Continuation of application No. 15/707,443, filed on Sep. 18, 2017, now Pat. No. 10,409,825.

(60) Provisional application No. 62/395,762, filed on Sep. 16, 2016, provisional application No. 62/395,725, filed on Sep. 16, 2016, provisional application No. 62/395,689, filed on Sep. 16, 2016.

(51) Int. Cl.
| | | |
|---|---|---|
| *G06F 16/30* | (2019.01) | |
| *G06F 16/2457* | (2019.01) | |
| *G06F 3/06* | (2006.01) | |
| *G06F 9/54* | (2006.01) | |
| *G06Q 50/00* | (2012.01) | |

(52) U.S. Cl.
CPC ...... *G06F 16/24578* (2019.01); *G06F 3/0659* (2013.01); *G06F 9/546* (2013.01); *G06Q 50/01* (2013.01)

(58) Field of Classification Search
None
See application file for complete search history.

(56) References Cited

U.S. PATENT DOCUMENTS 9,426,627 B1 * 8/2016 Logan .................. H04W 4/029
10,026,099 B1   7/2018 Joshi et al.
(Continued)

OTHER PUBLICATIONS

Article entitled "How to skip the line at popular Charlotte restaurants with the new app Nowait", by Moore, dated Jul. 21, 2016, 7 pages.

(Continued)

*Primary Examiner* — Mahesh H Dwivedi
(74) *Attorney, Agent, or Firm* — Foley & Lardner LLP

(57) ABSTRACT

The current disclosure describes a preselected information sharing application (PISA) system configured to generate a virtual queue dataset for a facility using data received from different users via a facility customer application (FCA) on devices of the users. The system further includes a facility management application (FMA) on devices within the facility configured to generate an interactive hyperlink associated to the facility and request the users within the virtual queue dataset to share the interactive hyperlink on social media platforms associated to the users. The FMA then monitors the activation of the interactive hyperlink by other users, and accordingly updates the virtual queue dataset to include other users and notify all users in the virtual queue dataset regarding the updated virtual queue dataset in real-time.

20 Claims, 12 Drawing Sheets

(56) References Cited

U.S. PATENT DOCUMENTS

| | | | |
|---|---|---|---|
| 2011/0307547 A1* | 12/2011 | Backer | G06Q 10/1095 |
| | | | 709/203 |
| 2012/0158934 A1 | 6/2012 | Xiao et al. | |
| 2013/0053004 A1 | 2/2013 | Siebert et al. | |
| 2014/0066029 A1 | 3/2014 | Brennan et al. | |
| 2015/0039689 A1 | 2/2015 | Pridmore | |
| 2015/0317702 A1 | 11/2015 | Liang et al. | |
| 2016/0078571 A1* | 3/2016 | Singh | G06Q 20/387 |
| | | | 705/14.66 |

OTHER PUBLICATIONS

Web-Archive Page of nowaitapp.com, by nowait, dated Dec. 5, 2015, 3 pages.

Article entitled Dining Conceirge App Launches Out of Beta, Arrives on Android:, by Perez, dated Feb. 4, 2015, 9 pages.

\* cited by examiner

US 10,762,093 B1

INCREASING SOCIAL NETWORK EFFECT IN QUEUE MANAGEMENT APPLICATIONS

CROSS-REFERENCE TO RELATED APPLICATIONS

This application is a continuation application of U.S. patent application Ser. No. 15/707,443, filed Sep. 18, 2017, which claims priority to U.S. Provisional Patent Application Ser. No. 62/395,762, filed on Sep. 16, 2016, U.S. Provisional Patent Application Ser. No. 62/395,725, filed on Sep. 16, 2016, and U.S. Provisional Patent Application Ser. No. 62/395,689, filed on Sep. 16, 2016, each of which is hereby incorporated by reference in its entirety.

TECHNICAL FIELD

The present invention generally relates to communication systems and more specifically to a multi-functional integrated communications system application for enhancing communication between customers and a facility management through use of automated agents.

BACKGROUND

Businesses create marketing campaigns to advertise their products to certain consumer demographics with the purpose of convincing some percentage of consumers to purchase their products. However, these marketing campaigns can be costly and sometimes ineffective unless interested potential consumers are the ones receiving the marketing information. The communication of marketing information to the consumers requires adequate real-time consumer information, which may require actively monitoring potential consumers. As the processing power of computers allow for greater computer functionality and the Internet technology era allows for interconnectivity between computing systems, many facilities virtually manage their resources and customer demand. As an example, using a service line in recent year's digital electronic communication has opened up new concepts of "virtual queues", which allow the customers/users to get in line/queue of a facility without being physically present. Allowing the customers in the virtual queue of the facility to promote resources of the facility to other potential customers can be desirable to increase network effect for the line, and increase the overall user base. Social media is a growing focus for many entities/facilities trying to monitor potential customers and for promoting their resources and goods. Using social media, entities/facilities are able to interact with potential customers on a more personal level than may be done through traditional advertising techniques. However, current virtual queue technology has not been able to utilize the social media, preventing social media promotional activities to be carried out because several technical challenges have rendered social media promotional activity task impractical. For example, current queue management software solutions have yet not been widely unsuccessful to integrate with the social media because it is technically challenging to create a unified software solution to be in synchronous contact with different parties (e.g., different people in the queue, potential other users trying to buy or sell their positions within the queue, and the facility, which may desire to monitor the queue), continuously monitor the queue, and update the parties in real time. Creating a unified software solution to address the above-mentioned problems is also technically challenging because requiring all the parties to use the same application may create a negative user experience. For example, some users may not desire to log into a unified system to create a reservation at a facility, change their position within the queue of the facility, or share queue information on their social media regarding the facility.

SUMMARY

For the aforementioned reasons, there is a need for an accurate, efficient, and user-friendly computer-implemented system and method to collect user data, generate, monitor, and optimize a virtual queue dataset, allow interactions between the users, potential customers, and the facility, continuously monitor and re-evaluate the queue dataset, and disseminate queue information to potential customers. The current disclosure describes a system and method that allows for re-ordering of user backlogs, eliminating traditional chronological ordering approach without resulting in social friction between customers in line and account for the facilities preferences when optimizing the queue.

In an embodiment, a computer-implemented method comprises querying, by the server, a plurality of data records within a database configured to store data records containing information about a plurality of facilities and a queue dataset associated with each facility comprising at least one user, wherein the queue dataset is a data record representing a queue of a plurality of users at each facility, and wherein each user within each queue dataset is ranked based on a ranking value within the queue; identifying, by the server, a first queue dataset corresponding to a first facility and having at least a first user associated with a first ranking; transmitting, by the server, during a first session on a channel within a communication platform associated with a bot coupled with the server, a first notification to the computing device of the first user, wherein the first notification comprises a request to share the first user's first ranking value and an incentive value for the first user, and wherein the communication platform is configured to receive the user request and route the user request to the bot of the server via a bot connector; upon receiving an approval from the first user during the first session, generating, by the server, an interactive hyperlink, wherein the interactive hyperlink is configured upon activation to direct a second user computing device to a web page containing an identification of the first facility, the first ranking value, and an invitation to join the first queue, and wherein the interactive hyperlink is configured to be displayed in a message disseminated on a social media account associated with the first user; transmitting, by the server, the interactive hyperlink to a social media application executing on the computing device of the first user, whereby the server causes the social media application to generate the message containing the interactive hyperlink on the social media account associated with the first user; receiving, by the server, an indication that the second user has activated the interactive hyperlink; transmitting, by the server, during a second session on a second channel within a second communication platform associated with the bot coupled with the server, a second notification to a computing device of the second user, wherein the second notification comprises a request for an identifier associated with the second user; upon receiving the identifier associated with the second user, updating, by the server, the first queue dataset to include the second user within the first queue dataset; and transmitting, by the server, during the first session on the channel within the communication platform associated with the bot coupled with the server, a third notification to the computing device of the first user, wherein the third notification comprises a confirmation message that the second user has activated the interactive hyperlink and has been included in the first queue dataset; and causing, by the server, a graphical user interface displayed on a computing device of the first facility to display a fourth notification comprising the identifier associated with the second user and the first queue dataset.

In another embodiment, a computer system comprises a server, which is configured to query a plurality of data records within a database configured to store data records containing information about a plurality of facilities and a queue dataset associated with each facility comprising at least one user, wherein the queue dataset is a data record representing a queue of a plurality of users at each facility, and wherein each user within each queue dataset is ranked based on a ranking value within the queue; identify a first queue dataset corresponding to a first facility and having at least a first user associated with a first ranking; transmit during a first session on a channel within a communication platform associated with a bot coupled with the server, a first notification to the computing device of the first user, wherein the first notification comprises a request to share the first user's first ranking value and an incentive value for the first user, and wherein the communication platform is configured to receive the user request and route the user request to the bot of the server via a bot connector; upon receiving an approval from the first user during the first session, generate an interactive hyperlink, wherein the interactive hyperlink is configured upon activation to direct a second user computing device to a web page containing an identification of the first facility, the first ranking value, and an invitation to join the first queue, and wherein the interactive hyperlink is configured to be displayed in a message disseminated on a social media account associated with the first user; transmit the interactive hyperlink to a social media application executing on the computing device of the first user, whereby the server causes the social media application to generate the message containing the interactive hyperlink on the social media account associated with the first user; receive an indication that the second user has activated the interactive hyperlink; transmit during a second session on a second channel within a second communication platform associated with the bot coupled with the server, a second notification to a computing device of the second user, wherein the second notification comprises a request for an identifier associated with the second user; upon receiving the identifier associated with the second user, update the first queue dataset to include the second user within the first queue dataset; and transmit during the first session on the channel within the communication platform associated with the bot coupled with the server, a third notification to the computing device of the first user, wherein the third notification comprises a confirmation message that the second user has activated the interactive hyperlink and has been included in the first queue dataset; and cause a graphical user interface displayed on a computing device of the first facility to display a fourth notification comprising the identifier associated with the second user and the first queue dataset.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
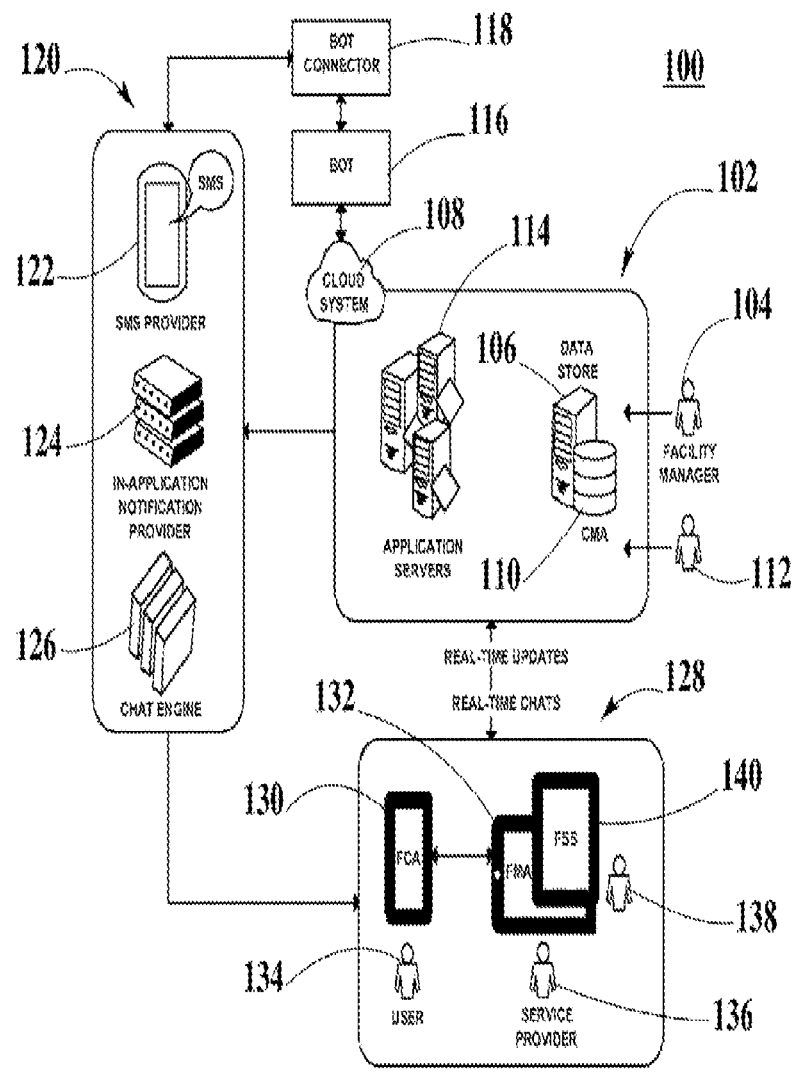
FIG. 1 illustrates an architectural diagram of a preselected information sharing application (PISA), according to an exemplary embodiment.

In the following description, numerous specific details are set forth. However, it is understood that embodiments of the invention may be practiced without these specific details. In other instances, well-known circuits, structures, and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

FIG. 1 illustrates an architectural diagram of PISA 100, according to an embodiment. An information storage system 102 may be a host entity that is configured to communicatively couple a plurality of facilities, a plurality of users, and a communication platform. The information storage system 102 is configured to allow a facility manager 104 to maintain facility information in a data store 106. In one example, the data store 106 may be configured as at least one solid state drive that stores the most frequently used data and a hard disk drive that stores less frequently used data. The data store 106 may store information about each facility in a plurality of data records, whereby inputs from the facility manager 104 will update the data records accordingly. The information storage system 102 may also store information in a cloud system 108, which may include or be separate from the data store 106. Information in the data store 106 includes user information and contains PII of those users, but also associates the users with an identifier such that information about the users can be distributed to other components of the PISA 100 without sharing the PII.

The data store 106 is connected to a content management application (CMA) 110. The CMA 110 is a user interface configured to allow editing, adding, and deleting content from the data records in the data store 106. An PISA manager 112 may access the CMA 110 to edit information in the data store 106. Additionally, the CMA 110 may be configured to allow information from the data records of the data store 106 to be transmitted to application servers 114.

The application servers 114 are depicted as a plurality of servers but may be configured as a single server. The application servers 114 store and execute a bot 116 that is communicatively coupled to a bot connector 118 executing on a communication platform 120. Bot diagram 200 further describes a system architecture for the bot 116 and the bot connector 118.

The communication platform 120 is communicatively coupled to the information storage system 102. The communication platform 120 may execute an application configured to allow a text-based or voice-based communication via a computing device to another user, e.g., a chat application, a text message application native to an operating system, or a text message application hosted by a social networking platform. For example, the communication platform 120 may include an SMS provider 122, an social media platforms 124, and/or a chat engine 126.

Communication platform 120 and the information storage system 102 are communicatively coupled to a facility system 128 for each facility. The facility system 128 may include a facility customer application (FCA) 130 for each user and a facility management application (FMA) 132 for each of the plurality of facilities. The application servers 114 host the application executed by the FCA 130 and FMA 132.

The FCA 130 is an application that has a user interface configured for a computing device of a user 134 to input requests for the facility (e.g., reservation, food order). Most requests from FCA 130 will be communicated via communication platform 120. The application server 114 receives information from the communication platform 120 and transmits appropriate information to the FMA 132. In some instances, the FCA 130 may communicate directly with the FMA 132. For example, the user 134 may interact with FCA 130 to conduct a real-time chat with a service provider 136 or facility manager 138 of FMA 132.

FMA 132 is an application for the service provider 136 to maintain operational information about the facility (e.g., reservations, users in line, incentives, user information). The FMA 132 may be connected to a facility server screen (FSS) 140. FSS 140 is an application configured to provide information to a user interface for the facility manager 138 regarding a particular aspect of the facility (e.g., food quantities in a restaurant). The FSS 140 communicates with the FMA 132 to update each user interface accordingly. According to an embodiment, real time updates are available between facility system 128 and information storage system 102, allowing user 134, service provider 136, and the facility manager 138 to mutually access updated information available from information storage system 102.

The FMA 132 receives information about the user's requests from the information storage system 102. However, the information does not include any PII of the user 134. In some instances, a first name or other identifier (e.g., username) may be used, but the FMA 132 does not receive contact information or a full name of the user 134. If the service provider 136 desires to contact the user 134, a message is transmitted to the information storage system 102 via the FMA 132 for delivery on the communication platform 120.

In operation, the application server 114 may receive, via the FCA 130 executed on a computing device of the user 134 during a session on a channel on a communication platform 120, a user request from the user 134. For example, the user 134 may utilize social media in order to initiate a chat session with the application server 114 via the FCA 130. The user may initiate the session (by initiating a chat session on a third-party website and selecting the application server 114 as a recipient of the chat session) and the application server 114 may display the FCA 130 on the chat session on the third-party website. The FCA 130 may be configured to receive user requests from the user 134 (and other users not shown) via the user 134 computing device and transmit the user requests to at least one of the bot 116 of the application server 114 or the FMA 132. The user requests may include PII associated with the users (e.g., age, sex, credit card number, and the like). The FCA 130 may transmit the user request to the application server 114 via the bot 116 or the bot connector 118. In some embodiments, the FCA 130 may also filter the sensitive PII and may not transmit the PII to the FMA 132. The application server 114 may display the FCA 130 on a communication platform 120 displayed on a computing device associated with the user 134 (e.g., the application server 114 may display the FCA 130 on the chat session used by the user 134). The FCA 130 may then use the communication platform 120 to transmit the user request to various computing devices described above. The communication platform 120 may be configured to receive, from the FCA 130, the user requests; the communication platform 120 may also be configured to route the user request to the bot 116 of the application server 114 via the bot connector 118. The communication platform 120 may also be configured to receive, from the facility system 128, a message corresponding to the user request. The facility system 128 may also comprise a user interface associated with the FMA 132, which is configured to be displayed on a facility computing device, wherein the user interface is configured to receive data associated with the facility. The application server 114 may allow the user 134 to communicate (via the FCA 130, bot 116, and/or bot connector 118) to various computing devices within the facility system 128. The application server 114 may also update a plurality of data records within the data store 106 configured to store the plurality of data records containing information about a plurality of facilities (including the facility system 128) and data records containing information about a plurality of users (including user 134 and other user not shown here), wherein the information about the plurality of users comprises personally identifiable information, wherein the server updates the plurality of data records based on the user request and the message corresponding to the user request.

In a non-limiting example, the user 134 may initiate a chat session with the application server 114 on a third party website (e.g., social media website) in order to reserve a table at a restaurant. Upon receiving an indication that a chat session has been initiated, the application server 114 may cause the FCA 130 to be displayed within the chat session on the social media website. The user 134 may type the user request and request to reserve a table at a particular restaurant. The user 134 may also indicate the number of patrons, a reservation time, and may include PII (e.g., credit card number in order to confirm the reservation). The FCA 130 may receive the data inputted by the user 134 and may utilize the communication platform 120 to transmit the user request to the bot connector 118, which is configured to transmit the user request to the bot 116 (e.g., the bot connector 118 is configured to route messages between the bot 116 of the application server 114 and the computing device of the user 134 via the channel of the communication platform 120 (e.g., different channels such as channels 122-126)).

The application server 114 may also (via the bot 116) transmit the user request to FMA 132. The FMA 132 is configured to receive and transmit information about the user 134 and the user request, from the FCA 130 via the bot 116 during the session, without any personally identifiable information of that user, update information about the facility in the data store 106, and receive and transmit information about the user 134 and the user request from the FCA 130 without communicating via the bot 116 during the session. For example, FMA 132 may receive the user request (e.g., table reservation for the user 134) and may display the user request on various computing devices associated with the facility system 128. An operator (associated with any of the computing devices of the facility system 128) may receive the user request on a user interface (e.g., FSS 140 and/or FMA 132) and may respond to the user request with a message corresponding to the user request (e.g., confirming the reservations based on the time and the number of patrons). The corresponding message then is received by the application server 114 (via FMA 132) and may transmit the message (via bot 116 and bot connector 118) to the FCA 130 (e.g., to be displayed to the user). The application server 114 may then update the data records within the data store 106 to reflect the reservation of the user 134. In some embodiments, the application server may facilitate a direct chat session between the user 134 and an operator at the facility system 128. For example, if the user 134 needs special accommodations, the user 134 may input the special accommodations into the chat session and the FCA 130 may transmit that special request directly to FMA 132 or FSS 140.

PISA 100 may also allow the facility manager 104 to input and access facility-related data into a data store 106, which is connected to a content management application (CMA 110). Data within the CMA 110 may be readily available for sharing with a PISA manager 112. Additionally, information from CMA 110 may also be shared with application servers 114. In addition, data from the information storage system 102 may be shared with the communication platform 120 (and all the other components described above). The communication platform 120 also shares information with a facility system 128, which may include a facility customer application (FCA 130) connected to a facility management application (FMA 132). In general, a facility manager 104 makes a limited intangible good available through FMA 132 included in PISA 100, and one or more users 134 are then able to sell, buy, bid, and exchange these goods amongst each other through PISA 100 user experience (UX) (e.g., different parties described within FIG. 1 and their interactions with numerous user interfaces provided by the PISA 100.

In an embodiment, user 134 may use the chatbot of any of the communication platform 120 to access bot 116. The user 134 may then request to join a virtual queue for a facility associated with the FMA 132. The application server 114 may update the data records of CMA 110 and Data store 106 and generate a virtual queue dataset representing the queue for the facility. Upon receiving an indication from FMA 132, the application server 114 may then contact user 134 (via the bot, FCA, or any other numerous methods described above) and offer the user 134 and incentive to share his queue data with others on a social media platform. Upon receiving approval, the application server 114 may then generate an interactive hyperlink configured to direct the user to the facility and invite others to join the virtual queue and transmit the link to the user 134's computing device. When the user 134 shares the hyperlink, the application server 114 may start monitoring whether any potential customers have engaged with the link. When an indication is received that a potential customer has engaged (interacted by clicking or any other means) with the link, the application server may update the queue dataset and add the potential customer to the virtual queue. The user 134 may then be compensated for each potential customer who join the virtual queue.

Figure 2:
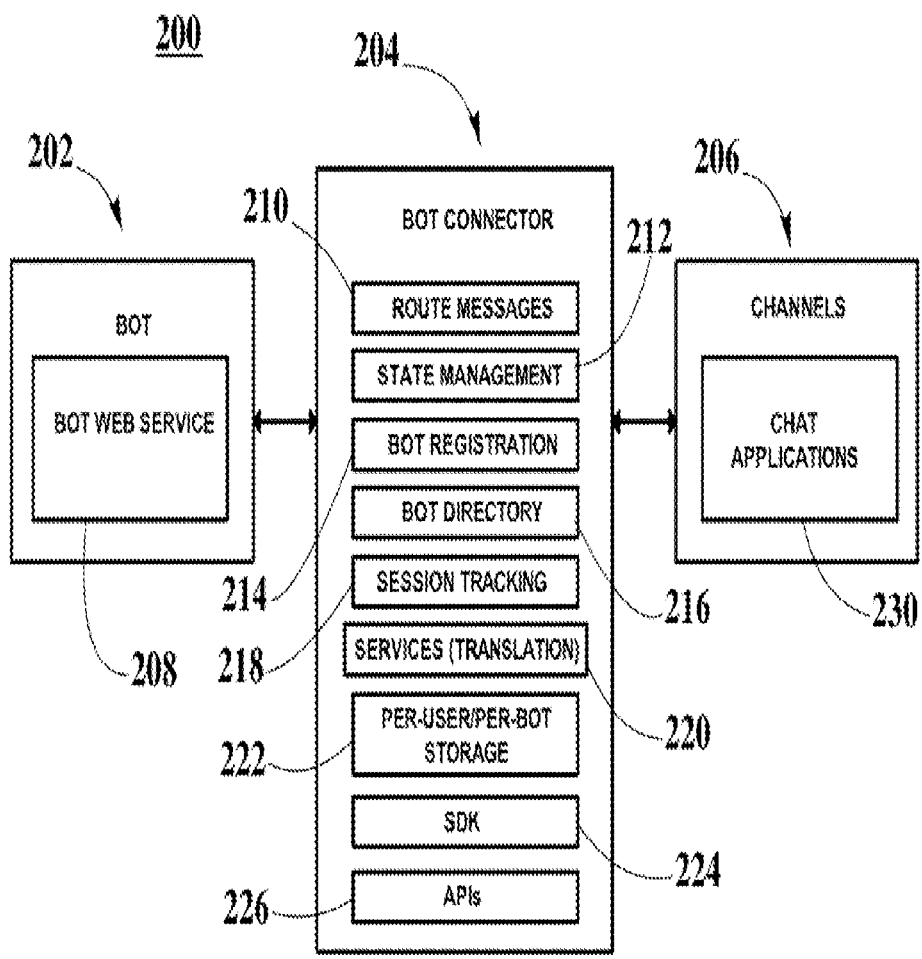
FIG. 2 illustrates a bot diagram that may be employed by the PISA in case of utilization via a chat application, according to an exemplary embodiment.

FIG. 2 illustrates a bot diagram 200 that may be employed by PISA 100 through a chat application, according to an embodiment. In FIG. 2, a bot 202 is connected to channels 206 via bot connector 204. Bot 202 may act as an automated agent that communicates and interacts with a customer 134 employing channels 206 and connecting through bot connector 204. Bot 202 simulates an intelligent conversation with a customer 134 (e.g., used interchangeably with the user 134), and may be designed to provide a semi-automated customer support for said customer 134. Bot 202 may include a bot web service 208 for connection with PISA 100. Bot connector 204 may include several functions, such as routing messages 210 from customer 134 via channels 206 to bot 202 and vice-versa; performing state management 212, meaning to manage all stored data within bot connector 204 at a given instant in time; performing bot registration 214 and managing a bot directory 216, allowing developers to release different bots 202 to the public (i.e. customers 134); performing session tracking 218, which is a way to track and maintain state of a customer 134, more specifically recognizing a particular customer 134 when said customer 134 sends a request to bot 202 through channels 206; performing services 220 such as translation of text from a customer 134 for clear comprehension of requests to bot 202, and translating bot 202 replies to customer 134 back to original language employed by said customer 134; allowing for per-user and per-bot storage 222, referring to data storage per particular customer 134 related to a corresponding bot 202; enabling access to a software development kit (SDK 224), allowing for development of new bots 202 and modification of existing bots 202; and allowing access to application programming interfaces (APIs 226) serving as interfaces for bots 202 and channels 206 to communicate with each other and for performing standard CRUD (create, read, update, delete) operations. Channels 206 may include suitable chat applications 230 such as Facebook Messenger™, LINE™, Skype™, Slack™, Skype™, and WhatsApp™, among others.

Figure 3:
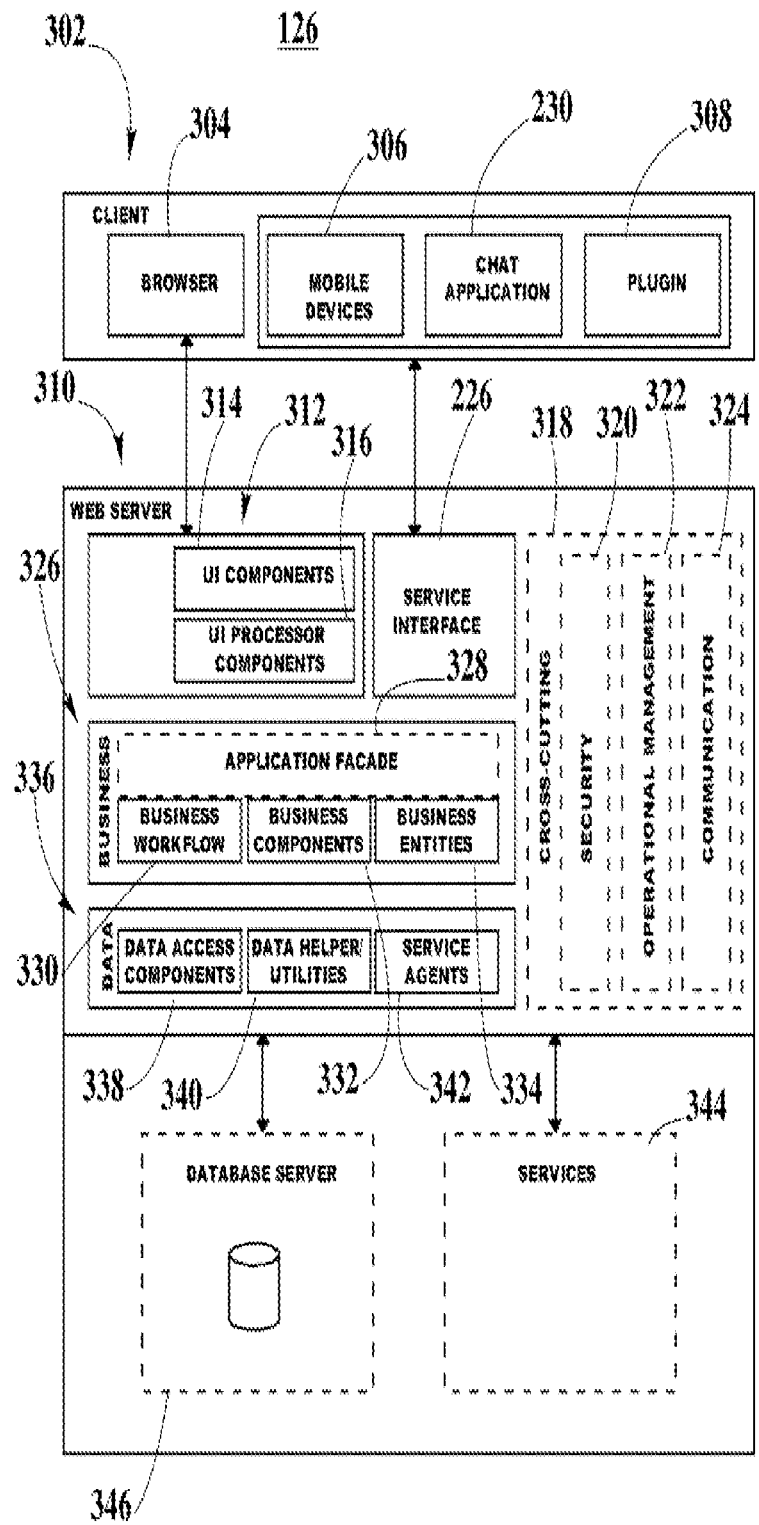
FIG. 3 illustrates an architectural diagram of a facility customer application (FCA) that may be employed by PISA, according to an exemplary embodiment.

FIG. 3 illustrates an architectural diagram of an FCA 130 that may be employed by PISA 100, according to an embodiment. In FIG. 3, FCA 130 includes a client 302 with a web browser 304, mobile devices 306, chat application 230, and a website plugin 308. Client 302 is connected to a web server 310 and is served presentation/user interface layer (presentation/UI layer 312) elements including UI components 314 and UI process components 316. Presentation/UI layer 312 may employ a caching system to load certain UI assets into memcache to reduce load times. Mobile devices 306, chat application 230, website plugin 308, and external resources, if existent, may communicate with PISA platform API 226. API 226 may be used to perform standard CRUD operations for PISA 100. Web server 310 may additionally include cross cutting functions 318 such as security 320, operational management 322, and communication 324. Security 320 may protect data by using user tokens and sessions. Operational management 322 may be used to suitably maintain factors relevant to business operation including business analytics, such as customer 134 count. Communication 324 may be employed to communicate to facilities, employees, or customers. A business function layer 326 may be used to hold business logic and rules, and may include application facade 328, business workflow 330, business components 332, and business entities 334. A data layer 336 may include data access components 338, data helpers/utilities 340, and service agents 342. Service agents 342 may be utilized to retrieve various services per customer 134. Data layer 336 may additionally hold data per application and communicate with services feature 344 to sync data between database server 346.

Figure 4:
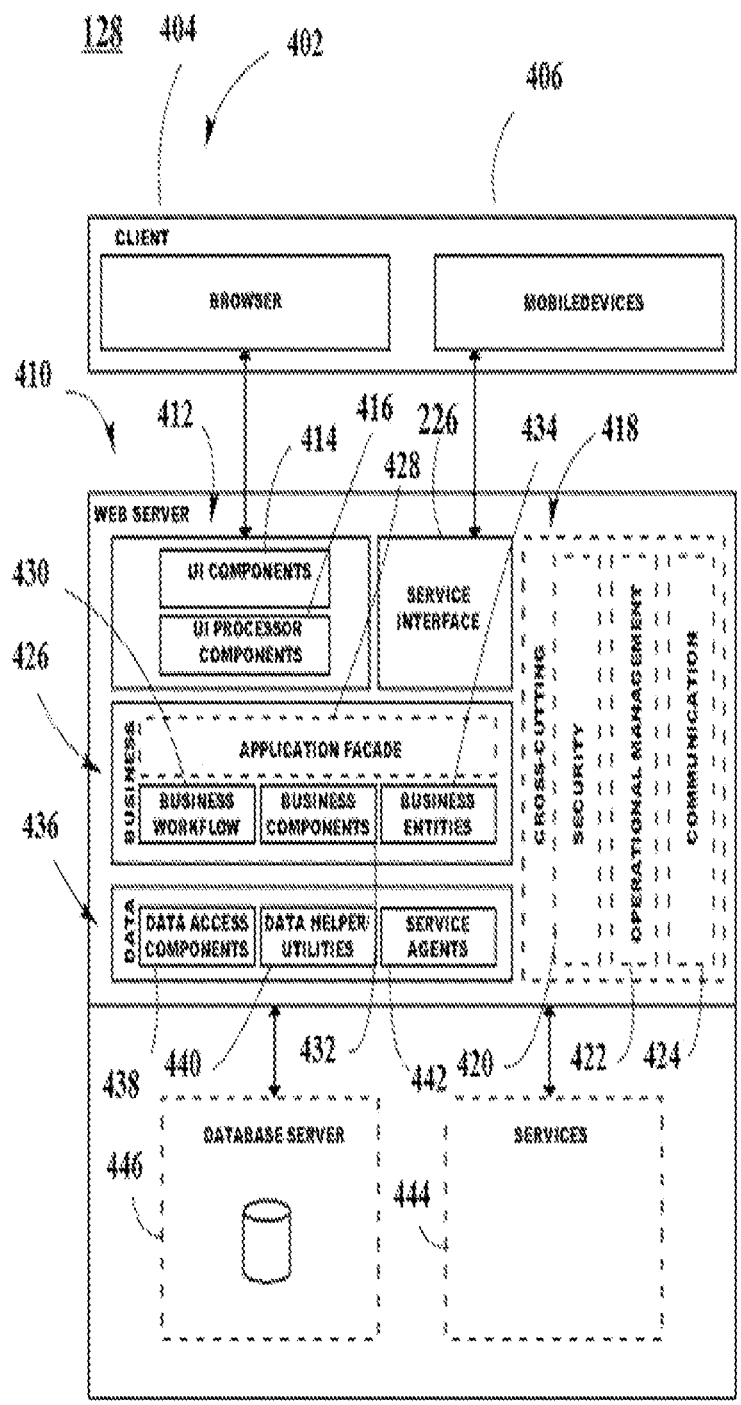
FIG. 4 illustrates an architectural diagram of a facility management application (FMA) that may be employed by PISA, according to an exemplary embodiment.

FIG. 4 illustrates an architectural diagram of FMA 132 that may be employed by PISA 100, according to an embodiment. FMA 132 may be employed to update and provide real time information about facility operations. In FIG. 4, FMA 132 includes a client 402 with a web browser 404 and mobile devices 406. Client 402 is connected to a web server 410 and is served presentation/UI layer 412 elements including UI components 414 and UI process components 416. Presentation/UI layer 412 may employ a caching system to load certain UI assets into memcache to reduce load times. Mobile devices 406 and external resources, if existent, may communicate with API 226 of PISA platform. API 226 may be used to perform standard CRUD operations for PISA 100. Web server 410 may additionally include cross cutting functions 418 such as security 420, operational management 422, and communication 424. Security 420 may protect data by using user tokens and sessions. Operational management 422 may be used to maintain factors relevant to business operation including business analytics, such as customer 134 count. Communication 424 may be employed to communicate to facilities, employees, or customers. A business function layer 426 may be used to hold business logic and rules, and may include application facade 428, business workflow 430, business components 432, and business entities 434. A data layer 436 may include data access components 438, data helpers/utilities 440, and service agents 442. Service agents 442 may be utilized to retrieve various services per customer 134. Data layer 436 may additionally hold data per application and communicate with services feature 444 to sync data between database server 446.

Figure 5:
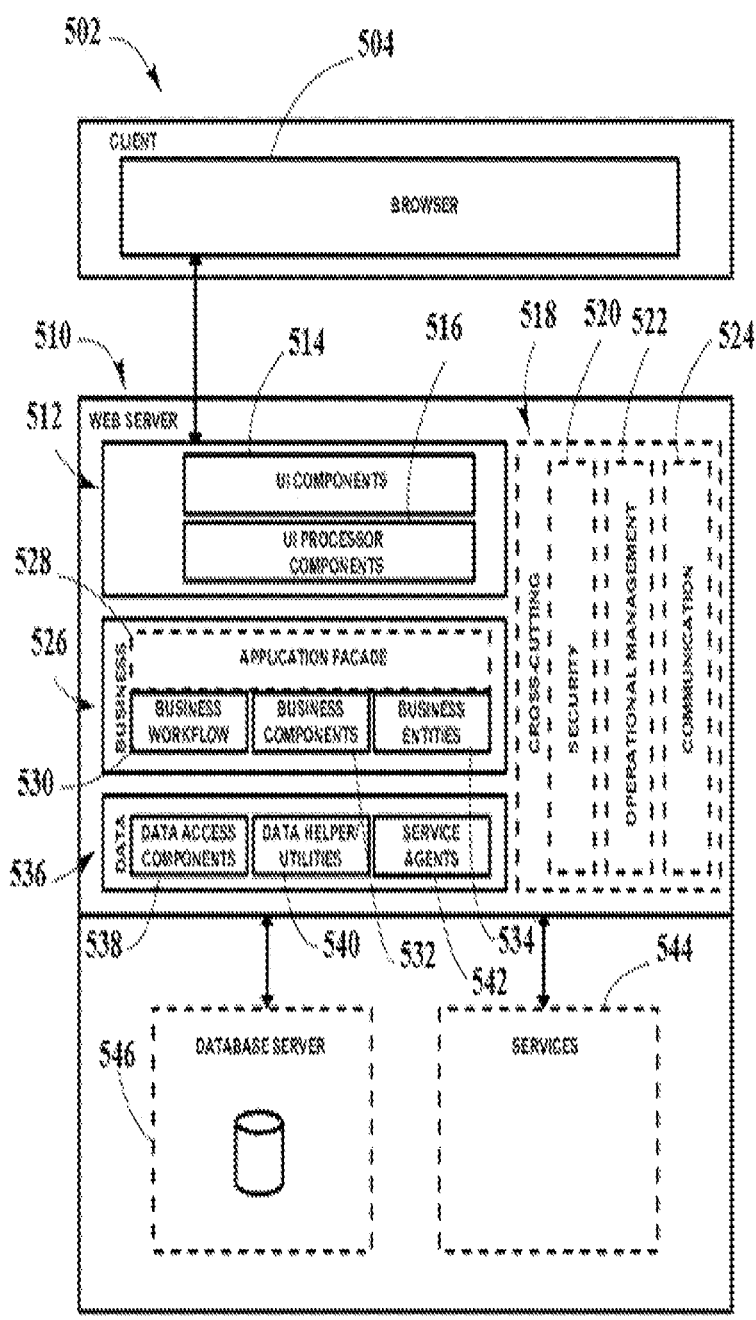
FIG. 5 illustrates an architectural diagram of a content management application (CMA) that may be employed by PISA, according to an exemplary embodiment.

FIG. 5 illustrates an architectural diagram of CMA 110 that may be employed by PISA 100, according to an embodiment. CMA 110 may manage the full life cycle of content components, from inception through removal. CMA 110 may create, maintain, and remove content components to and from a repository. In FIG. 5, CMA 110 includes a client 502 with a web browser 504. Client 502 is connected to a web server 510 and is served presentation/UI layer 512 elements including UI components 514 and UI process components 516. Presentation/UI layer 512 may employ a caching system to load certain UI assets into memcache to reduce load times. Web server 510 may additionally include cross cutting functions 518 such as security 520, operational management 522, and communication 524. Security 520 may protect data by using user tokens and sessions. Operational management 522 may be used to maintain factors relevant to business operation including business analytics, such as customer 134 count. Communication 524 may be employed to communicate to facilities, employees, or customers. A business function layer 526 may be used to hold business logic and rules, and may include application facade 528, business workflow 530, business components 532, and business entities 534. A data layer 536 may include data access components 538, data helpers/utilities 540, and service agents 542. Service agents 542 may be utilized to retrieve various services per customer 134. Data layer 536 may additionally hold data per application and communicate with services feature 544 to sync data between database server 546.

Figure 6:
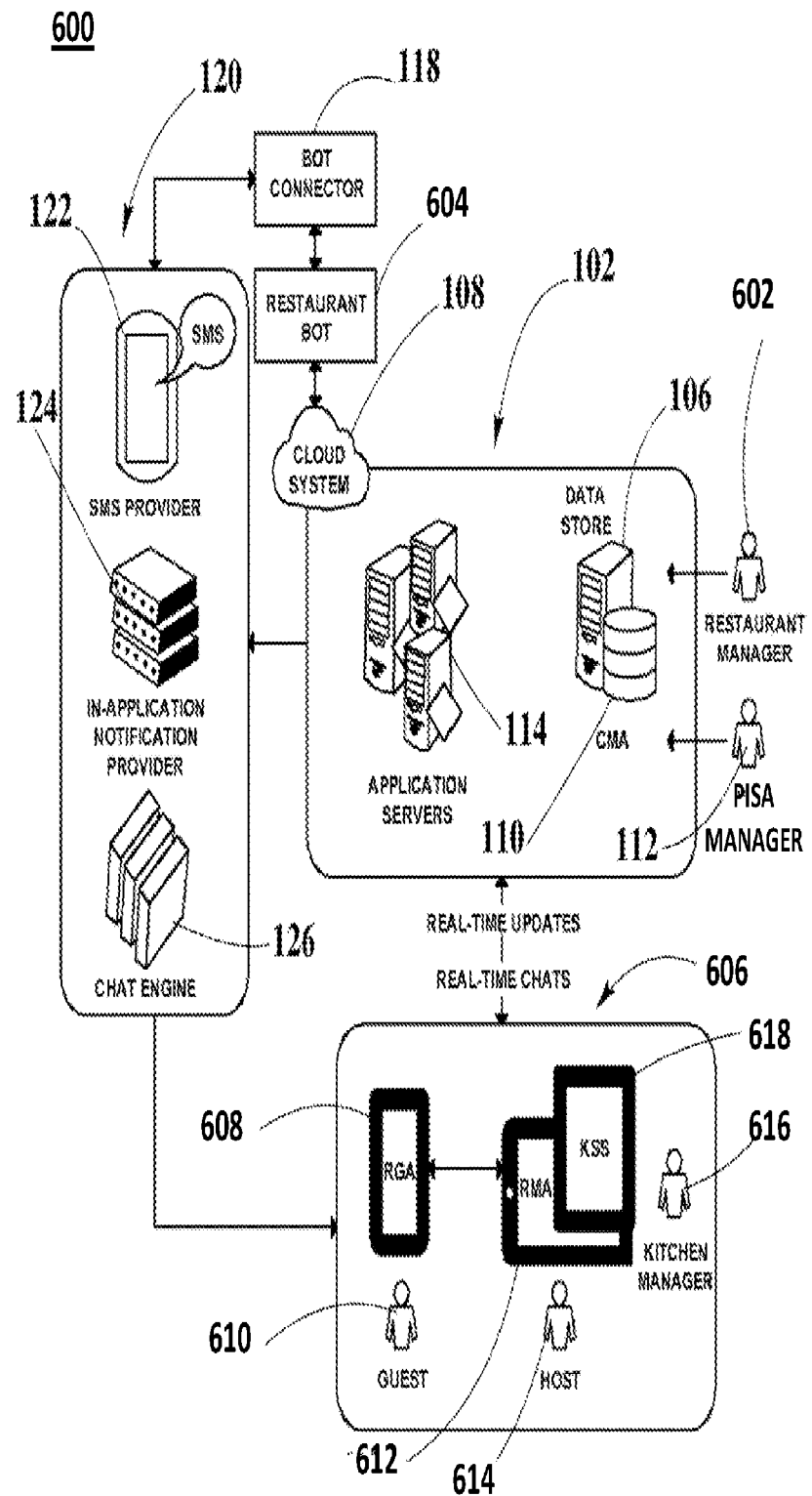
FIG. 6 illustrates an architectural diagram of PISA applied for assessing and managing a restaurant line in order to optimize restaurant resources and capacity, according to an exemplary embodiment.

FIG. 6 illustrates an architectural diagram of PISA 100 applied for optimizing operations in a restaurant including available seats, kitchen size, menu items, and staffing levels through management of a restaurant line, according to an embodiment.

FIG. 6 illustrates an architectural diagram of PISA 100 applied by a user 134 in a restaurant line to make line spot transactions with another user 134 in the same restaurant line, according to an embodiment. In FIG. 6, an information storage system 102 allows for a restaurant manager 602 to input and access restaurant information into an hard disk drive utilized by the data store 106, which is connected to a content management application (CMA 110). Information in CMA 110 may be readily available for sharing with PISA manager 112. Additionally, information from CMA 110 may also be shared with application servers 114. According to an embodiment, suitable information in information storage system 102 may include restaurant location, restaurant menu with food types and prices, and restaurant wait time, amongst others. Information included in information storage system 102 may additionally be stored in a suitable cloud system 108, such as Amazon® Web Service (AWS). In addition, information from information storage system 102 may be shared with any other module within the described PISA 100, which may include an in-application notification provider utilizing various methods disclosed in above. Application server 114 may also share information with a restaurant bot 604, which may include a restaurant guest application (RGA 608) connected to a restaurant management application (RMA 612). RMA 612 may in turn be also connected to a kitchen server screen (KSS 610). RGA 608 registers requests and other information from users 134.

According to an embodiment, real time updates are available between restaurant bot 604 and information storage system module 102, allowing a user 134, host 614, and restaurant manager 616 to mutually access information available from information storage system 102. For example, a request that affects a waiting line, such as a request from a user 134 to swap a spot in a line with another user may be registered by RGA 608, transferred to RMA 612 and displayed to a restaurant manager 602 via KSS 618. The request may also be shared with all elements of information storage system 102 so that the information database is kept continuously updated. RMA 612 may as well allow a restaurant manager 602 to create a restaurant line. The term "lines", as used herein, may refer to virtual restaurant lines, meaning that users 134 do not stand physically in said line.

Figure 7:
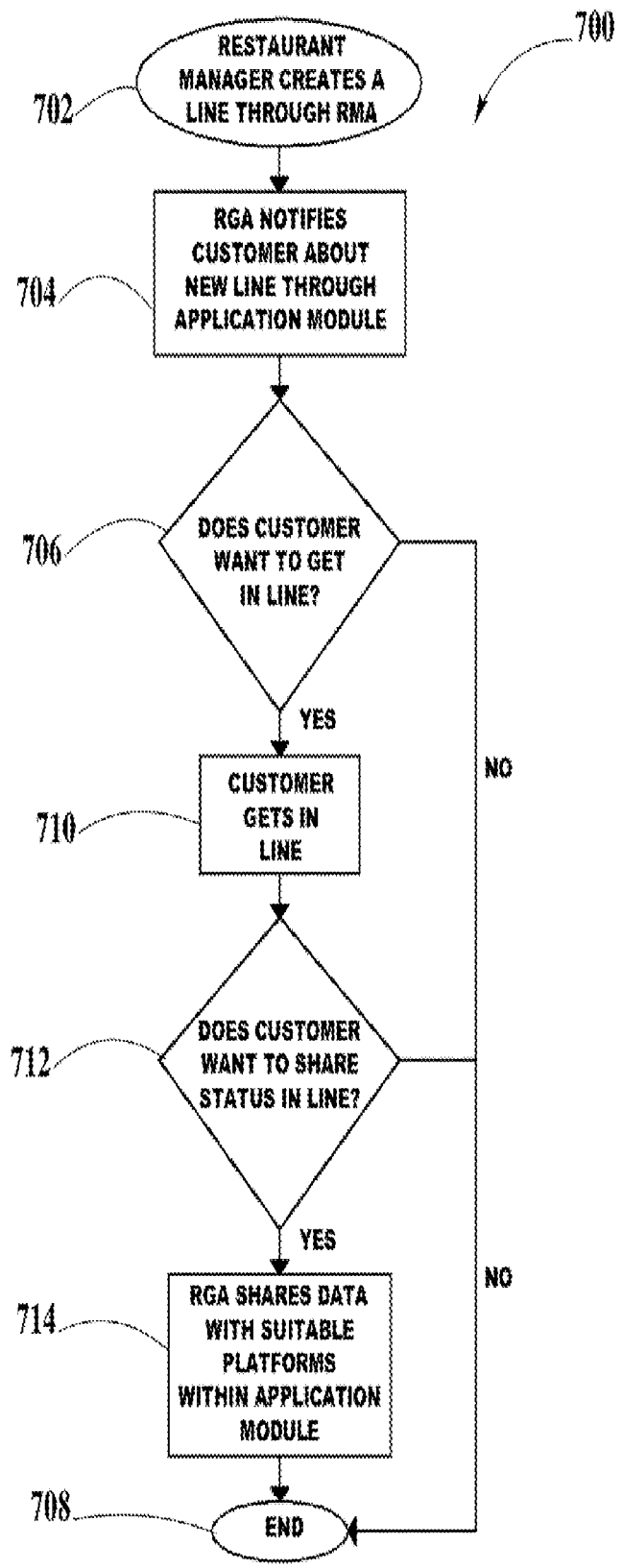
FIG. 7 illustrates a preselected information sharing method employed by PISA, according to an exemplary embodiment.

FIG. 7 illustrates a preselected information sharing method 700 employed by PISA 100, according to an embodiment. Preselected information sharing method 700 may employ an architectural diagram of PISA 100 such as the one shown in FIG. 6. Preselected information sharing method 700 starts when a restaurant manager creates a line through RMA 702. Then, RGA notifies customers through application module about the creation of the new line 704, which may be performed through an SMS, in-application notifications, or chat applications connected to PISA 100. Subsequently, a customer 134 gets an option to get in line 706. In negative case, the process may end 708. In positive case, a customer gets in line 710. Afterwards, RGA gives an option to customers to share their status in line 712. In negative case, the process may end 708. In positive case, RGA shares data with suitable platforms within application module 714.

In cases of communication between RGA 606 and customers 134, RGA 606 first communicates with RMA 612, which analyzes data and shares the data with information storage system module 102. Therein, information is shared in a cloud system 108 and on to application server 114. For example, the fact of a customer 134 getting in line at a restaurant may be shared to other potential customers 134 through suitable platforms such as an SMS via an SMS provider (e.g., bot connector 118), a chat via a chat engine 126, or social media via social media platforms 124. Other preselected information regarding a customer 134 restaurant line status may be shared through suitable platforms, such as the fact that a customer 134 has made a transaction in line with other customers 134, or that a customer 134 has moved one or more places in line. According to an embodiment, at moments when other potential customers 134 are displayed preselected information, potential customers 134 may also be prompted to get in line and to share their line status to other potential customers 134, thus increasing network effect and user database for PISA 100 and facilities registered with PISA 100. According to an embodiment, other features included in preselected information sharing method 700 of PISA 100 include sharing preselected information only with targeted users. For example, when customers 134 share preselected information with other potential customers 134, they may be provided an option to select only a certain segment of their contacts, such as closer friends in social media platforms 124, individual potential customers 134 through SMS with a link to preselected information, individual chats through chat engine 126, and the like. In one embodiment, a system comprises an application module, including at least one in app notification provider configured to deliver real-time communication to a facility module, said facility module configured with a facility management application; an information storage system module including application servers, rapid storage technology and separate content management application configured and arranged to enable to rapid transfer of communications and processing of information within the integrated communications system application; wherein real-time updates and real-time chats are communicated between the information storage module and the facility module. In this example, once customers are virtually in line, customers may be prompted to share preselected information (e.g., customer is in line, is making a transaction in line, and is moving one or more spots in line) in real time through suitable platforms including SMS provider, chat engine, and social media platforms.

Figure 8:
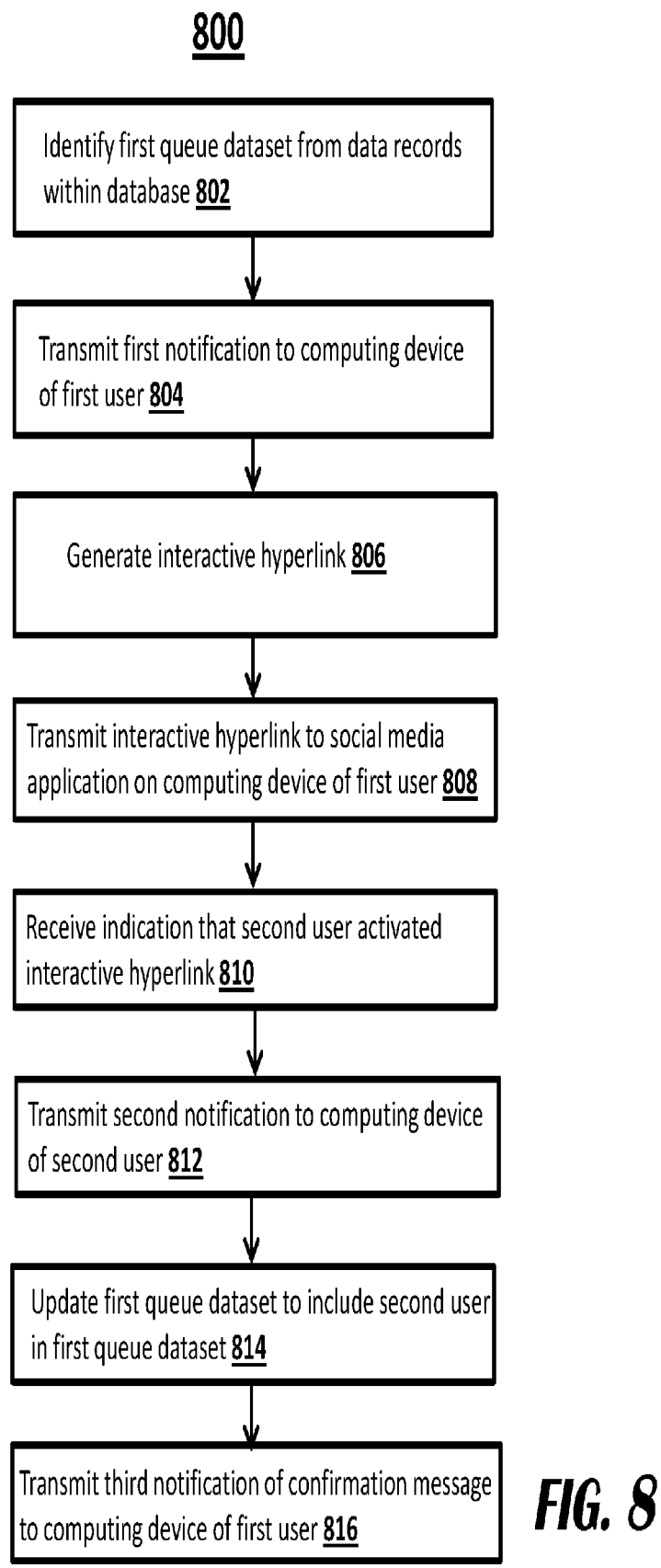
FIG. 8 shows execution of a method for promoting a facility, according to an exemplary embodiment.

FIG. 8 shows execution steps for a method for promoting a facility, according to an exemplary method 800. The exemplary method 800 shown in FIG. 8 comprises execution steps 802, 804, 806, 808, 810, 812, 814, and 816. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 800 of FIG. 8 is described as being executed by a single server computer in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In a first step 802, a server may generate instructions to query a plurality of data records within a database. The database may be configured to store the data records. The data records stored in the database may contain information about a plurality of facilities. The data records stored in the database may further contain information about a queue dataset associated with each facility. For example, the plurality of facilities may include a plurality of restaurants. The data records associated to each of the plurality of facilities may contain a queue dataset. The queue dataset associated to each of the plurality of facilities may contain a record of one or more users in a queue for each of the plurality of facilities. As used herein the words "user" may be synonymous with the word "customer" as the person, or groups of people who are receiving the services of a facility such as a restaurant/cafe.

In some embodiments, the data records stored in the database may contain a queue dataset for each of the plurality of facilities where each user within each queue dataset may have a rank value. The server may assign a rank value to each user within each queue dataset based on a ranking algorithm. In some embodiments, the ranking algorithm may include one or more software program and/or instructions, which may be executed by the server to assign a rank value to each user within each queue dataset associated to each of the plurality of facilities based on a position of each user within each queue associated to each of the plurality of facilities.

In some embodiments, the server may identify a first queue dataset from the plurality of data records within the database. The server may identify the first queue dataset corresponding to a first facility. The first queue dataset may include one or more users such as a first user, and the first user may have a rank value such as first rank among the one or more users in the queue dataset associated to the first facility. In some embodiments, the server may identify a plurality of queue datasets from the plurality of data records within the database. The server may further identify the plurality of queue datasets corresponding to a plurality of facilities. Each of the plurality of queue datasets may have one or more users and each of the one or more users may have a rank value.

In a next step 804, a first session may be established between a computing device of a first user in a first queue dataset corresponding to a first facility and a server. In this example, the computing device of the first user in the first queue dataset may be a personal digital assistant (PDA), although the computing devices could be other types of personal wireless computing devices such as a portable media players, a portable gaming systems, phones, and/or other similar devices. Such wireless computing devices may be handheld, body-worn, head-worn, or otherwise portably carried about by the first user.

In some embodiments, the server may initiate the first session with the computing device of the first user. The first session between the computing device of the first user and the server may be operable on multiple channels within a communication platform such as web-based channel, a telephone-based channel, or the like operable on the computing device of the first user. The web-based channel may include any communication applications operable on a web domain at the computing device of the first user such as but not limited to Facebook, Skype, Yahoo etc. The telephone-based channel may include any communication applications operable on a telephone domain at the computing device of the first user such as but not limited to SMS, MMS, Whatsapp, Line, WeChat etc.

In some embodiments, a communication session between the computing device of the first user and the server may begin when a first user operating the computing device is properly authenticated as a user by the server. Upon authentication of the first user by the server, the user may select a web-based channel and/or a telephone-based channel to establish the session with the server. The web-based channel and/or the telephone-based channel applications may be installed on the computing device of the first user, and the first user may be provided with an option to select at least one channel installed on the computing device to establish the session with the server. In some embodiments, a communication channel for exchanging text or voice messages may be inbuilt in the computing device of the first user, and the first user may select the inbuilt channel available on a facility customer application installed on the computing device to establish the communication session with the server.

Upon generation of the session between the computing device of the first user and the server, the server and/or the computing device of the first user may generate a session record for a web-based interaction between the computing device of the first user and the server. The session record generated by the server and/or the computing device of the first user may contain data fields related to the interaction between the server and/or the computing device of the first user, such as a session identifier, a timestamp, a first user identifier, and source device information identifying the computing device (e.g., IP address, MAC address) of the first user. In some embodiments, the session record generated by the server and/or the computing device of the first user may include one or more session attributes that may include at least a device identifier uniquely identifying the computing device of the first user. The device identifier uniquely identifying the computing device of the first user may be selected from a group consisting at least one of a phone number, an IP address, and a device ID.

Upon the generation and the activation of the session between the server and the computing device of the first user, the server may then transmit a first notification to the computing device of the first user. The first notification may include a request to share the first user's first ranking value and an incentive value for the first user. For example, the server may request the first user of the computing device to provide a rank value in the queue in the queue dataset of the first facility (for example, a restaurant). The server may also request the first user of the computing device to provide an incentive the first user is interested in such as discount option, reward option, cash option, or the like in order to promote the first facility, as described in FIG. 9D. For example, the server may display an option for the user and query the user as to whether the user is interested in sharing his queue information with others on a social media platform.

In a next step 806, a server may receive a response from the first user during the first session between the server and/or the computing device of the first user regarding the inputs for the first user's ranking value in the queue of the first facility and the incentive value for the first user. In some embodiments, the computing device of the first user may only provide the answers in response to the request received from the server regarding the first user's ranking value in the queue of the first facility and the incentive value for the first user. In some embodiments, the computing device of the first user may also provide additional information in addition to the answers for the request received from the server regarding the first user's ranking value in the queue of the first facility and the incentive value for the first user where the additional information may include one or more offers the first user in interested in that are not mentioned in the incentives offered by the server.

In some embodiments, the server upon receiving the answers for the questions in the request from the computing device of the first user, the server may then generate an interactive hyperlink. The interactive hyperlink generated by the server may be a string of text or a computer graphic that any user can "click" with the mouse pointer, which will immediately load a new browser page that the hyperlink is programmed to present to the users. For example, the interactive hyperlink may be configured such that upon activation of the interactive hyperlink by any user, the interactive hyperlink may direct the user to a web page containing an identification of the first facility, a first ranking value of the first user, and an invitation to join the first queue of the first facility.

In some embodiments, the interactive hyperlink may be configured to be displayed in a message disseminated on a social media account associated with the first user. For instance, in a next step 808, upon generation of the interactive hyperlink, the server may transmit the interactive hyperlink to a social media application executing on the computing device of the first user. The social media application may include but not limited to Facebook, Twitter, Blog, Sound Cloud, or the like. In some embodiments, the server may have pre-authorized approval from the first user to transmit the interactive hyperlink to each social media application being executed on the computing device of the first user. In some embodiments, the server may request for an approval from the first user to publish the interactive hyperlink to each social media application being executed on the computing device of the first user, and upon receiving the approval from the first user, the server may then transmit the interactive hyperlink to the social media applications authorized by the first user that are being executed on the computing device of the first user. Upon the receipt of the interactive hyperlink on the social media applications being executed on the computing device of the first user, the server may then generate and execute instructions that cause each of the social media applications being executed on the computing device of the first user to generate a message containing the interactive hyperlink on social media accounts associated with the first user on each of the social media applications. For example, if the first user has a Twitter account, the server may then publish (for instance, tweet) the interactive hyperlink using the Twitter account of the first user. The server may (using various API technology) generate a social media message and embed the hyperlink within the social media message and direct the user to "share" the message himself.

In a next step 810, a server may receive an indication that a second user operating a second computing device has activated the interactive hyperlink published on the social media applications of the first user. For example, the server may receive a notification and/or a message each time the interactive hyperlink published on the social media applications of the first user is clicked by any user. The notification and/or the message received by the server may include but not limited to a name of the social media application of the first user on which the interactive hyperlink was clicked, a date and time at which the interactive hyperlink was clicked, and a device identifier uniquely identifying the second computing device of the second user. The device identifier uniquely identifying the computing device of the second user may be selected from a group consisting at least one of a phone number, an IP address, and a device ID.

In a next step 812, a server upon receiving the indication that the second user operating the second computing device has activated the interactive hyperlink published on the social media application of the first user may then initiate a session (for example, a second session) with the computing device of the second user. In some embodiments, the second session between the server and the computing device of the second user may be operable on multiple second channels within a second communication platform such as web-based channel, a telephone-based channel, or the like operable on the computing device of the second user. The web-based channel may include any communication applications operable on a web domain at the computing device of the second user such as but not limited to Facebook, Skype, Yahoo etc. The telephone-based channel may include any communication applications operable on a telephone domain at the computing device of the second user such as but not limited to SMS, MMS, Whatsapp, Line, WeChat etc.

In some embodiments, a second communication session between the server and the computing device of the second user may begin when the second user operating the computing device is properly authenticated as a user by the server. Upon authentication of the second user by the server, the second user may select a web-based channel and/or a telephone-based channel to establish the second session with the server. The web-based channel and/or the telephone-based channel applications may be installed on the computing device of the second user, and the second user may be provided with an option to select at least one channel installed on the computing device to establish the second session with the server. In some embodiments, a second communication channel for exchanging text or voice messages may be inbuilt in the computing device of the second user, and the second user may then select the inbuilt channel on the computing device to establish the second communication session with the server.

Upon generation of the second session between the computing device of the second user and the server, the server and/or the computing device of the second user may then generate a session record for a web-based interaction between the computing device of the second user and the server. The session record generated by the server and/or the computing device of the second user may contain data fields related to the interaction between the server and/or the computing device of the second user, such as a session identifier, a timestamp, and source device information identifying the computing device (e.g., IP address, MAC address) of the second user. In some embodiments, the session record generated by the server and/or the computing device of the second user may include one or more session attributes that may include at least a device identifier uniquely identifying the computing device of the second user. The device identifier uniquely identifying the computing device of the second user may be selected from a group consisting at least one of a phone number, an IP address, and a device ID.

Upon the generation and the activation of the session between the server and the computing device of the second user, the server may then transmit a second notification to the computing device of the second user. In some embodiments, the second notification may include a request to confirm an identifier data associated with the second user. In some embodiments, the second notification may include a request to provide the identifier data associated with the second user. The identifier data associated with the second user may include a name of the second user, contact information of the second user, and a device identifier of the computing device of the second user.

In a next step 814, the computing device of the second user on receiving the request from the server may confirm the identifier data received from the server or may transmit the identifier data associated with the second user to the server. The server upon receiving the identifier data associated with the second user from the computing device of the second user may then update the first queue dataset associated to the first facility in the database to include the data associated with the second user within the first queue dataset. For example, the server may add the second user name into the queue for the first facility when the second user confirms to the server to visit the first facility post the activation of the interactive hyperlink on the social media application of the first user.

In a next step 816, server may transmit a third notification to the computing device of the first user. The server may transmit the third notification to the computing device of the first user during a session. In some embodiments, when the server determines that the session with the computing device of the first user has been terminated, the server may request a new session with the computing device of the first user. Upon the beginning of a new session between the server and the computing device of first user, the server may then transmit a notification message indicating the confirmation that the second user has activated the interactive hyperlink on the social media application of the first user and the second user has been included in the first queue dataset of the first facility. The server may also transmit a notification message to the computing device of first user corresponding to the incentive amount that has been transferred to an account associated with the first user.

In some embodiments, the server may also cause a graphical user interface displayed on a computing device of the first facility to display a notification where the notification may include the identifier data associated with the second user and the first queue dataset. For example, if the queue of the first facility had 4 users, then server may update the queue to 5 user by adding the second user into the queue of the first facility and subsequently publish the updated queue on the graphical user interface of the computing device of the first facility.

Figure 9A:
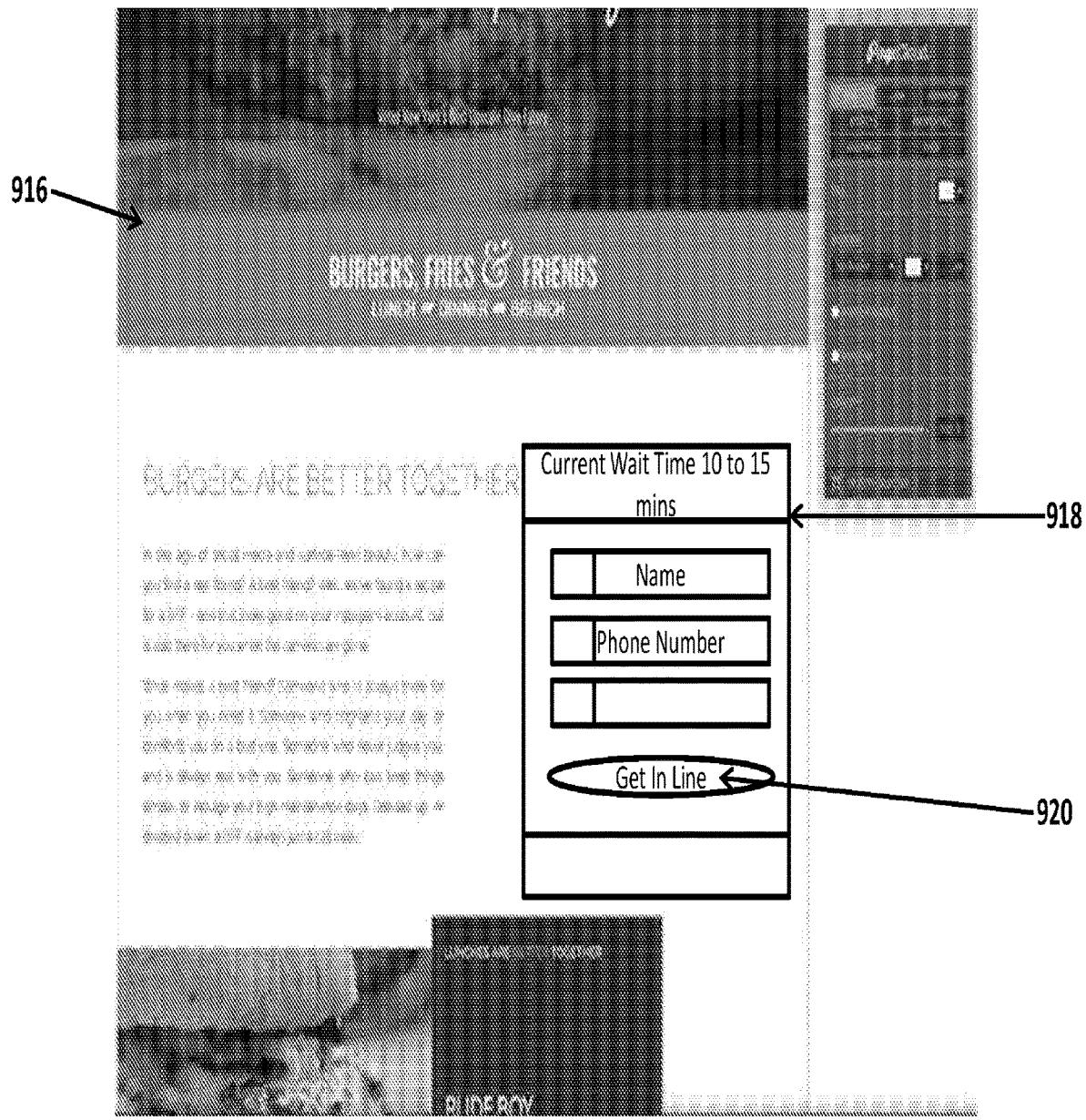
FIG. 9A illustrates a graphical user interface showing a webpage executed on a computing device of a user, according to an exemplary embodiment.

FIG. 9A shows a graphical user interface 900 showing a webpage 916 executed on a computing device of a user, according to an exemplary embodiment. In some embodiments, the computing device may be any portable or non-portable device, such as a desktop computer, a laptop computer, a tablet computer, a smart phone, a smart watch, a gaming console, a personal digital assistant, or the like. The computing device may include a processor/microcontroller and/or any other electronic component that performs one or more operations according to one or more programming instructions. The computing device may be capable of communicating with a system server through a communications network using wired or wireless communication capabilities.

A facility customer application (FCA) may be installed on the computing device of the user or may be configured to display on a website of a facility. For example, a facility manager may generate the FCA as a widget 918 configured to communicate with different users and the widget 918 may be displayed on the website of the facility. A server may have access to one or more databases or pre-stored web-based interfaces, such as webpages, comprising a number of preconfigured sub-interfaces, or containers, that are dynamically populated (e.g., widget box 918). For example, facility webpages may contain code, such as HTML or PHP, presenting a website of any number of webpages having a common "look-and-feel." One or more outputs or results may display webpages 916 that may contain additional code for containers, where the container code displays an FCA widget 918. A user may access a webpage 916 and interact with the server via the FCA widget 918. In some implementations, the server may be configured to require user authentication based upon a set of user authorization credentials (e.g., username, password, biometrics, cryptographic certificate) to provide access to the FCA on the computing device. For example, the server may access a system database configured to store the user credentials, which the webserver may be configured to reference in order to determine whether a set of entered credentials purportedly authenticating the user match an appropriate set of credentials that identify and authenticate the user. Similarly, in some implementations, the webserver may generate and serve applications/webpages associated to the facility customer application to the computing device based upon a user membership account. In some embodiments, the webserver may generate and serve applications/webpages associated to the facility (such as the webpage 916) to the computing device based upon a user role. In such implementations, a user role may be defined by data fields in the user records stored in the system database, and authentication of the user and the user role may be conducted by the webserver by executing an access directory protocol.

During operation, a user may accesses the webpage 916 by any common access method, e.g., keying in a URL, selecting from search results, etc., and submit user credentials to access the facility customer application. Upon the webserver authenticating the user using credentials that identify the user as a valid member of the facility, the user is presented the FCA (via the widget box 918). The widget box 918 may be a description window that may provide information regarding a current waiting time for a lunch/dinner reservation and data fields for information to be submitted to make a reservation at the facility. For instance, the user may enter information, such as date, time, number of guests, call back number, and name, and clicks on the "Get in Line" button 920 in the widget box 918. The user may be able to make the reservation at any time of day, and therefore the restaurant/facility does not need to be open, so the user does not need to wait for an inconvenient time to telephone the restaurant.

Figure 9B:
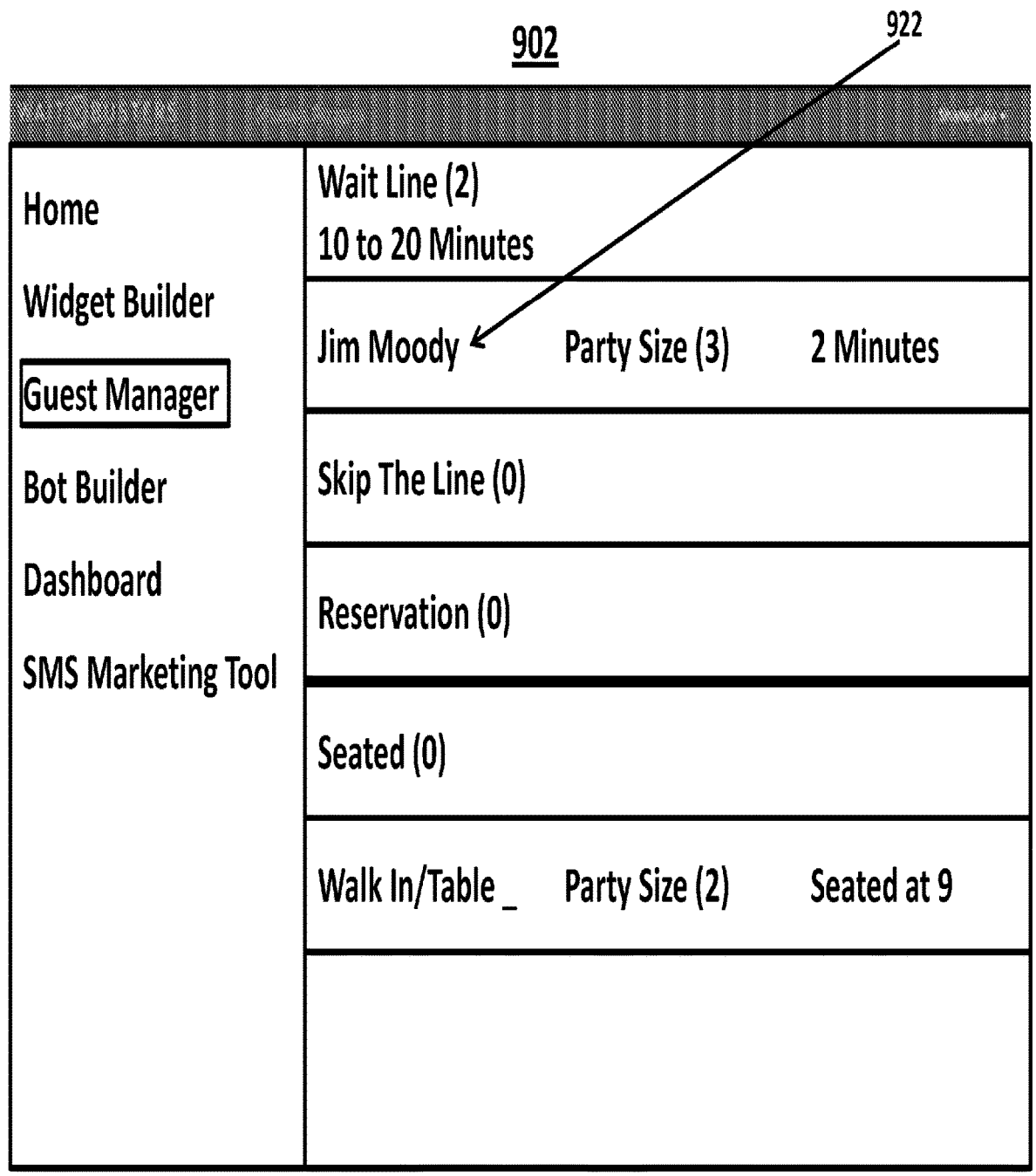
FIG. 9B illustrates a graphical user interface showing a webpage of a FMA of a facility, according to an exemplary embodiment.

FIG. 9B shows a graphical user interface 902 showing a webpage of a facility management application (FMA) of a facility, according to an exemplary embodiment. When the user clicks on the Get in Line button 920 on the FCA widget 918 at the computing device, a request of the reservation is transmitted to the restaurant and is displayed in a queue 922 on the FMA at the facility computing system of the restaurant/facility. The reservation of the user may be confirmed via a chat session using an application server prior to adding user information in the queue 922 displayed on the graphical user interface 902 of the facility computing system at the facility. The queue 922 may display names and data of others users such as current status of reservation for each user (for example, seated or waiting time for each user) and party size of each user. The FMA displayed on the graphical user interface 902 may also indicate multiple options such as an option for a restaurant manager to turn on (or turn off) a skip the link option (e.g., allow or deny users the option to switch their place within the restaurant line or the queue dataset).

The FMA displayed on the graphical user interface 902 may also integrate information regarding the restaurant. For example, the FMA may allow the restaurant manager to enter data regarding the restaurant, such as walk in tables, users already seated (e.g., number of patrons already seated at the restaurant). In some embodiments, the server may continuously update the queue dataset based on the information received from the FMA. For example, if the server received an indication that a user has walked in (via the FMA), the queue dataset and other pertinent information (e.g., estimated wait time for new user using the FCA to join the restaurant line) may be updated and the FMA graphical user interface 902 may reflect the changes.

Figure 9C:
FIG. 9C illustrates a graphical user interface showing a webpage of a FMA of a facility, according to an exemplary embodiment.

FIG. 9C shows a graphical user interface 904 showing a webpage of a FMA of a facility, according to an exemplary embodiment. As discussed, when the user clicks on the Get in Line button 920 on the facility customer application at the computing device, a request of the reservation is transmitted to the restaurant and is displayed in a queue list 924 on a facility management application (FMA) at the facility computing system of the restaurant/facility. The queue list 924 may display names and data of others users such as phone number of each user, current status of reservation for each user (such as seated or waiting time for each user), party size of each user, and current location of each user. The queue list 924 may further display a plurality of tabs for an administrator of a facility to cancel (using cancel tab) or edit (using edit tab) the reservation for any user in the queue and then notify (using notify tab) the user regarding any change in status of the reservation of the user.

Figure 9D:
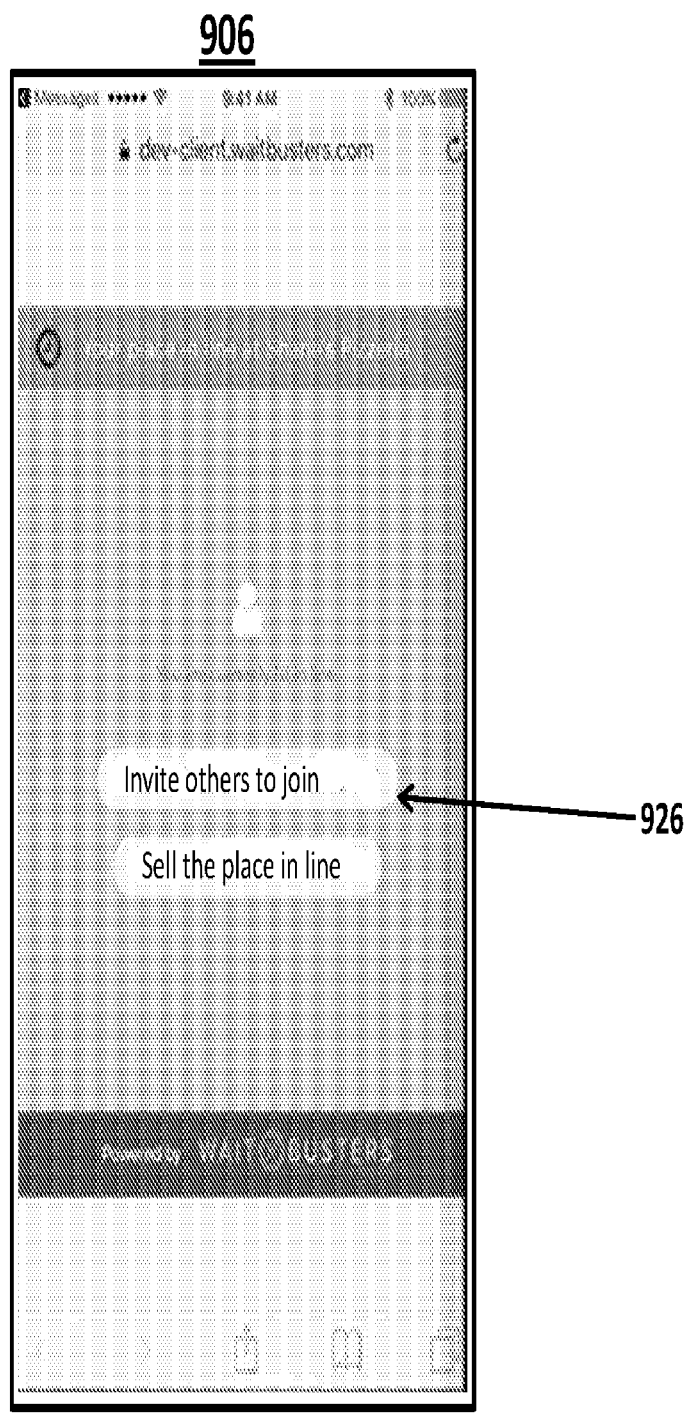
FIG. 9D illustrates a graphical user interface showing a webpage of a FCA executed on a computing device of a user, according to an exemplary embodiment.

FIG. 9D shows a graphical user interface 906 showing a webpage of a facility customer application (FCA) executed on a computing device of a user, according to an exemplary embodiment. Upon the user being added into the queue list 924, the facility management application may transmit a confirmation message to the facility customer application at the computing device of the user. Upon receipt of the confirmation message on the facility customer application at the computing device of the user, the facility customer application at the computing device of the user may display a plurality of tabs 926 indicating a tab for a ranking number in the queue for a user, a tab to invite the user to share his information with other users on his social media platform, a tab to sell their place/position in the queue, and a tab to request to skip the line in the queue for a pre-determined amount. The user of the computing device may select any tab such as a tab to sell their place in the queue for a pre-determined amount and thereby initiate and transmit a request to auction/sell their place in the queue to other users in return of the pre-determined amount.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A computer-implemented method comprising:
in response to receiving a request from a first electronic device operated by a first user within a queue of a facility, generating, by a server, an interactive hyperlink configured to direct a second electronic device to a web page containing an identification of the facility, a position of the first user within the queue, and an invitation to join the queue, wherein the interactive hyperlink is configured to be displayed in a message disseminated on social media accounts;
transmitting, by the server, the interactive hyperlink to a social media application associated with the first user and executing on the first electronic device, whereby a social media server electronically publishes the interactive hyperlink;
in response to receiving an indication that a second user operating the second electronic device has activated the interactive hyperlink:
transmitting, by the server to the first electronic device, a notification comprising an indicator of the second user and a request for approval to transfer the position of the first user within the queue to the second user;
in response to receiving an approval from the first electronic device, transmitting, by the server to the second electronic device, data associated with the queue comprising a confirmation that the second user has been added to the queue.

2. The method of claim 1, wherein the server communicates with at least one of the first and second electronic devices using an automated bot protocol.

3. The method of claim 1, wherein the server causes the social media application to generate the message containing the interactive hyperlink on a social media account associated with the first user.

4. The method of claim 1, wherein the notification further comprises a monetary incentive amount to be transferred from the second user for transferring the first user's position within the queue.

5. The method of claim 1, wherein the server rearranges a dataset associated with the queue to include the second user instead of the first user.

6. The method of claim 1, wherein the web page further displays an estimated wait time.

7. The method of claim 1, wherein the interactive hyperlink does not include any personally identifiable information associated with the first user.

8. The method of claim 1, wherein the interactive hyperlink is transmitted, by the server, directly to the first electronic device.

9. The method of claim 8, wherein the first electronic device transmits the interactive hyperlink to the second electronic device.

10. The method of claim 1, wherein the server transmits a second notification a computer associated with the facility, the second notification comprising at least one of an indication of the queue and data associated with the second user.

11. A computer system comprising:
a first electronic device operated by a first user within a queue of a facility;
a second electronic device operated by a second user;
a server in communication with at least the first electronic device, the server configured to:
in response to receiving a request from the first electronic device, generate an interactive hyperlink configured to direct a second electronic device to a web page containing an identification of the facility, a position of the first user within the queue, and an invitation to join the queue, wherein the interactive hyperlink is configured to be displayed in a message disseminated on social media accounts;
transmit the interactive hyperlink to a social media application associated with a first user operating the first electronic device, whereby a social media server electronically publishes the interactive hyperlink;
in response to receiving an indication that a second user operating the second electronic device has activated the interactive hyperlink:
transmitting, to the first electronic device, a notification comprising an indicator of the second user and a second request for approval to transfer the position of the first user within the queue to the second user;
in response to receiving an approval from the first electronic device, transmit, to the second electronic device, data associated with the queue comprising a confirmation that the second user has been added to the queue.

12. The system of claim 11, wherein the server is further configured to communicate with at least one of the first and second electronic devices using an automated bot.

13. The system of claim 11, wherein the server is further configured to cause the social media application to generate the message containing the interactive hyperlink on a social media account associated with the first user.

14. The system of claim 11, wherein the notification further comprises a monetary incentive amount to be transferred from the second user for transferring the first user's position within the queue.

15. The system of claim 11, wherein the server is configured to rearrange a dataset associated with the queue to include the second user instead of the first user.

16. The system of claim 11, wherein the web page further displays an estimated wait time.

17. The system of claim 11, wherein the interactive hyperlink does not include any personally identifiable information associated with the first user.

18. The system of claim 11, wherein the interactive hyperlink is transmitted, by the server, directly to the first electronic device.

19. The system of claim 18, wherein the first electronic device transmits the interactive hyperlink to the second electronic device.

20. The system of claim 11, wherein the server is further configured to transmit a second notification a computer associated with the facility, the second notification comprising at least one of an indication of the queue and data associated with the second user.

* * * * *